United States Patent [19]
Frasier et al.

[11] Patent Number: 5,053,760
[45] Date of Patent: Oct. 1, 1991

[54] GRAPHICS PATH PREDICTION DISPLAY

[75] Inventors: Richard A. Frasier, Grass Valley; F. Andrew Witek, Nevada City; Charles Q. Hoard, Grass Valley; Neil R. Olmstead, Nevada City; William C. Lange, Grass Valley, all of Calif.

[73] Assignee: The Grass Valley Group, Inc., Nevada City, Calif.

[21] Appl. No.: 380,344

[22] Filed: Jul. 17, 1989

[51] Int. Cl.$^5$ ............................................. G09G 1/06
[52] U.S. Cl. .................................... 340/725; 340/728; 340/747; 364/518
[58] Field of Search ............... 340/725, 729, 747, 728; 358/22, 182, 183; 352/50, 51, 52; 364/518, 521

[56] References Cited

U.S. PATENT DOCUMENTS

| | | | |
|---|---|---|---|
| 4,600,919 | 7/1986 | Stern | 340/725 |
| 4,797,836 | 1/1989 | Witek et al. | 340/725 |
| 4,864,517 | 9/1989 | Maine et al. | 340/725 |
| 4,947,255 | 8/1990 | Jackson et al. | 358/183 |
| 4,947,256 | 8/1990 | Wood et al. | 358/182 |
| 4,952,051 | 8/1990 | Lovell et al. | 340/725 |
| 5,007,005 | 4/1991 | Hatakeyama et al. | 340/725 |

*Primary Examiner*—Alvin E. Oberley
*Assistant Examiner*—M. Fatahiyar
*Attorney, Agent, or Firm*—Francis I. Gray; Boulden G. Griffith

[57] ABSTRACT

A graphics path display has fixed wireframes representing key positions of an image being manipulated. Inbetween wireframes, dots or dashes are generated according to a defined display rate between sequential key positions. The inbetween wireframes are generated by an algorithm selected by an operator, and are adjusted in realtime as the operator changes variable parameters for the algorithm to present a realtime display of the graphics path defined by the algorithm and parameters.

2 Claims, 3 Drawing Sheets

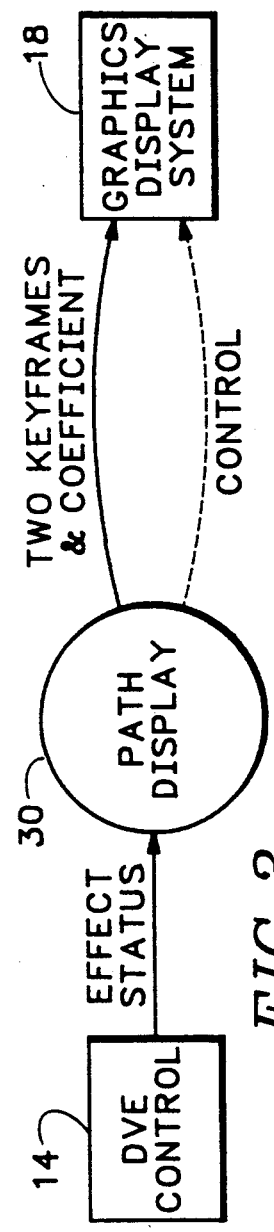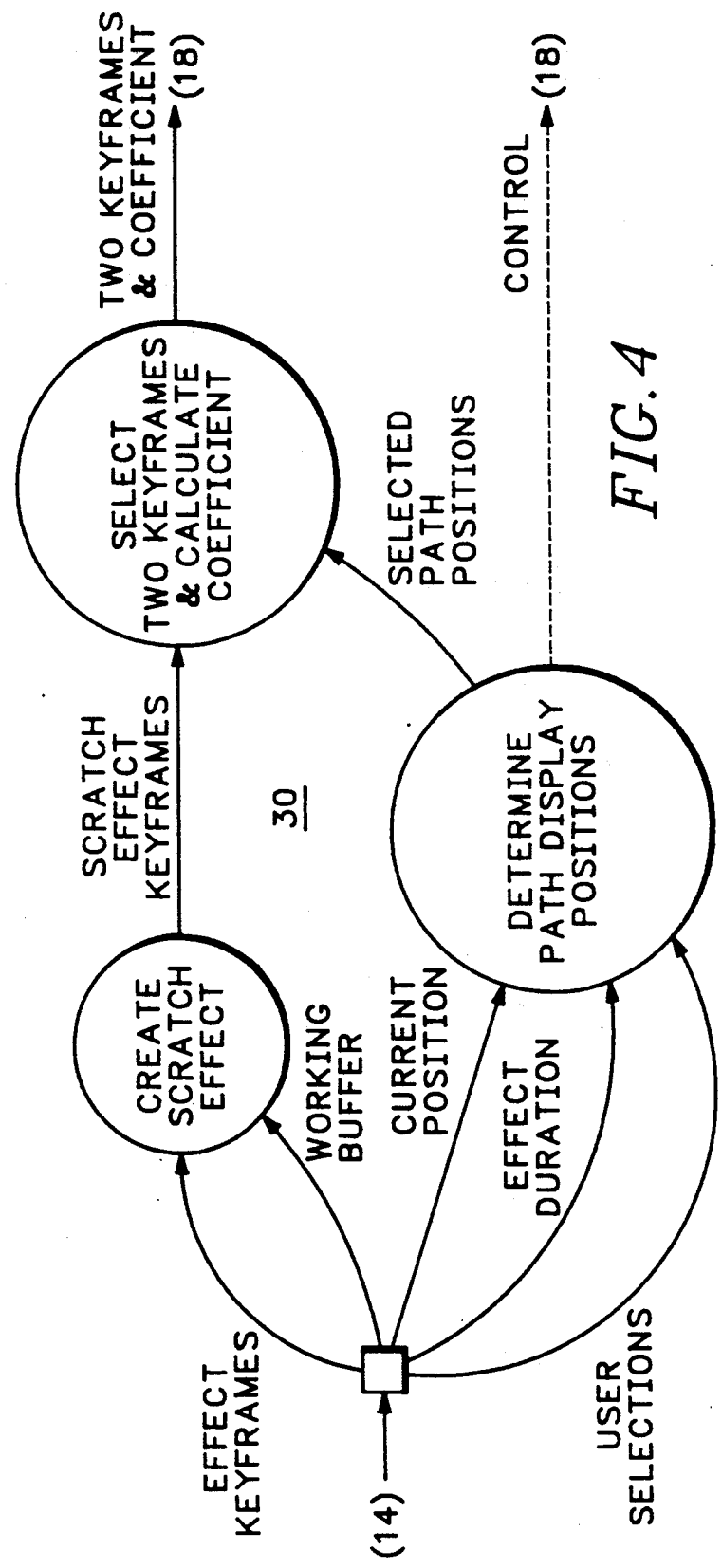

GRAPHICS PATH PREDICTION DISPLAY

BACKGROUND OF THE INVENTION

The present invention relates to graphics display systems for digital video effects (DVE) systems, and more particularly to a graphics path prediction display to provide visual assistance to an operator in developing and modifying a video effect without actually running the effect.

One of the functions of a DVE system is to manipulate two dimensional video images in a three dimensional "universe". A graphics display system emulates this function using "wireframes" that are outlines of the video images in place of the actual video images. Under operator control the DVE system allows images to be rotated and moved freely within the three dimensional universe. The operator uses this facility to define critical positions, or keyframes, within the universe. A series of keyframes forms a video effect. After building the effect the operator causes the DVE system to automatically run the effect. The DVE system runs the effect by generating a series of inbetween positions that fall between each pair of sequential keyframes within the effect. This series is generated at video field rates to give the appearance of motion.

The series of inbetween points that is selected forms the path that the run of an effect follows. DVE systems provide multiple algorithms for determining these inbetween positions, and allows the operator to select from the resulting multiple paths on a keyframe by keyframe basis. For example one of the algorithms may allow the operator to exercise further control over the path by adjusting path control parameters, such as tension, continuity and bias. U.S. Pat. No. 4,797,836 issued Jan. 10, 1989 to Witek et al discloses such an algorithm. These parameters also may be varied on a keyframe by keyframe basis. However, although the operator has a large amount of control over the path that the effect takes, the result of changes due to the choice of algorithm or parameters is not visible until the effect is run.

Therefore what is desired is a graphics path prediction display that provides visual assistance to an operator in modifying a video effect by showing the path that the effect will follow when run.

SUMMARY OF THE INVENTION

Accordingly the present invention provides a graphics path prediction display by showing a predicted motion path for a video effect as an operator modifies various parameters defining the video effect so that the operator can observe how the effect will appear when run. A wireframe is generated for display at each of a plurality of defined positions, generally referred to as keyframes. Then a plurality of inbetween wireframes, dots or dashes are generated for display at selected display intervals according to a display algorithm and parameters selected by the operator. As the operator selects other algorithms, varies parameters or manipulates keyframes, new inbetween wireframes, dots or dashes are generated for display so that the display indicates in realtime the predicted motion path between the keyframes that would occur if the effect is run according to the modified keyframes, algorithms or parameters.

The objects, advantages and novel features of the present invention are apparent from the following detailed description when read in conjunction with the appended claims and attached drawing.

BRIEF DESCRIPTION OF THE DRAWING

FIG. 3 a general state diagram view for the graphics path prediction display of the present invention.

FIG. 4 is a state diagram view of a path display algorithm for the graphics path prediction display of the present invention.

DESCRIPTION OF THE PREFERRED EMBODIMENT

Figure 1:
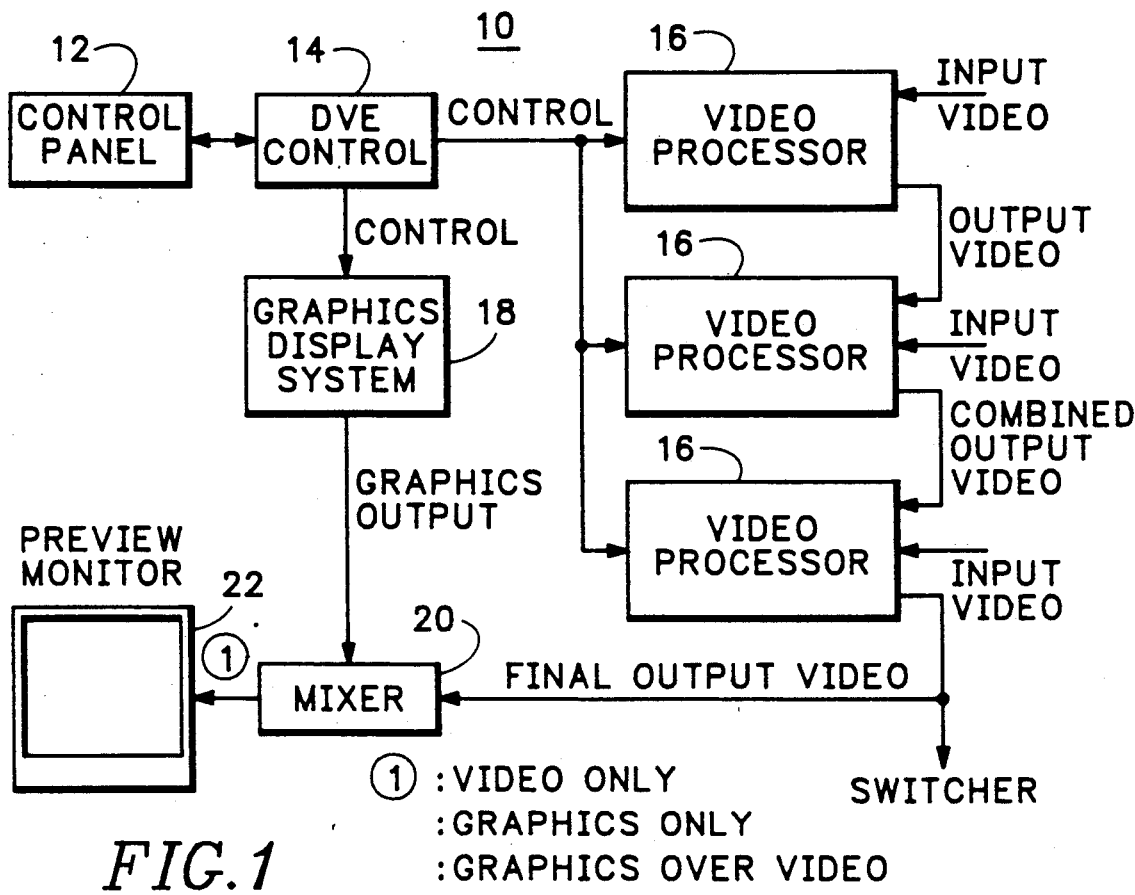
FIG. 1 is a block diagram view of a video effects system incorporating the graphics path prediction display of the present invention.

Referring now to FIG. 1 a video effects system 10 has a control panel 12 that serves as an operator interface and interacts with a controller circuit 14. The controller circuit 14 provides control signals to various image processors 16 and to a graphics display system 18. The image processors 16 receive input images from various sources, such as storage media, computers or video sources, and in combination provide a final output image for display. The graphics display system provides a graphics output that is input to a mixer 20. The final output image also is input to the mixer 20 to provide either the graphics output, the final output image or the graphics output overlayed with the final output image. The output of the mixer 20 is displayed on a monitor 22 so that an operator can observe the effects of inputs at the control panel 12 used to manipulate the various images produced by the image processors 16.

Wireframes representing a path display for a video effect may be displayed against a black background, with the key wireframes being white and the inbetween wireframes being a shade of grey for differentiation. Alternatively, the key wireframes may be one color and the inbetween wireframes may be another color. The wireframes also may be displayed over the final output image in the same manner. Further this feature may be operated in conjunction with a reduced viewport feature, such as that described in co-pending U.S. patent application Ser. No. 07/228,087 filed Aug. 4, 1988 by the present inventors entitled "Reduced Viewport for Graphics Display", so that the path display may be observed in the entire universe rather than just the portion of the universe encompassed by the display. This simultaneous plotting of the wireframes provides a time-domain view of the path. For z-axis transformations the "hidden" portions of the wireframes may be suppressed. Also alphanumerics may be used to identify the key positions and the source of the image being manipulated.

A graphics path display algorithm generates a series of display points that are normally displayed when the effect is run. These points may be represented with graphic images, such as the wireframes discussed above that represent the outline of the actual video image, dots 25 or dashed lines 27 as shown alternatively in FIG. 2. This set of display points includes the keyframe points and inbetween points that represent all the display points defined by the effect. An operator selects a subset of all path points for display, as well as the graphic representation of these points. Each display point in the effect is a function of the time into the effect, or its position in the effect, so that& position may be considered a time value measured from the beginning of the effect.

Figure 2:
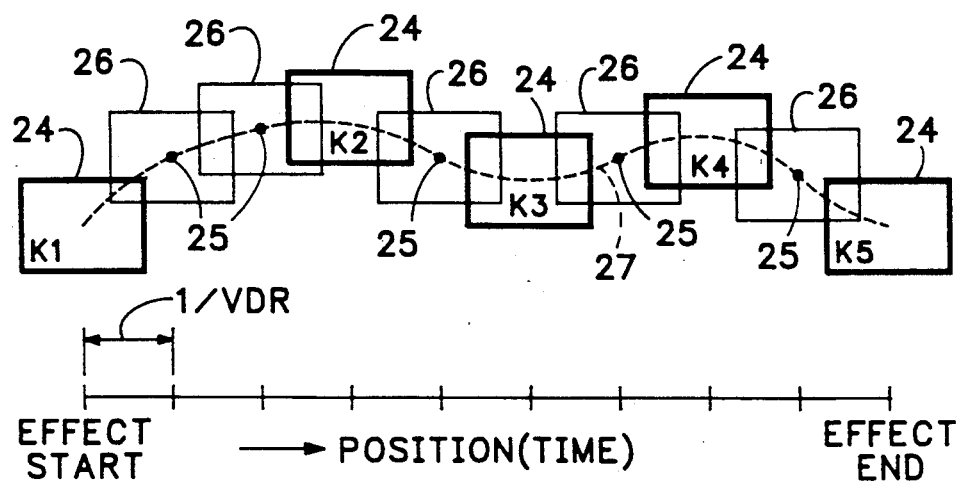
FIG. 2 is an illustrative view of a video effect that uses the graphics path prediction display of the present invention.

The complete set of path display points as shown in FIG. 2 is determined from the effect keyframes 24, a working buffer within the DVE controller 14, the effect duration (T) and a video display rate (VDR) such as a standard television field rate of thirty frames per second, each frame being two fields. The digital video effects system calculates a display point for each video image position defined by the effect. The effect includes the display points that are determined from a series of positions spaced equally 1/VDR apart in time and includes "inbetween" positions 26. The total number of positions, P, is determined by the product of the effect duration and the VDR $$P = T \cdot VDR.$$

These positions may be displayed in real-time with one position per 1/VDR ("run" mode), or the system may be parked at a particular position ("update" mode).

As shown in FIG. 3 a path display algorithm 30 receives information from the digital video effects controller 14 and outputs display information in the form of two keyframes and an associated coefficient to the graphics display system 18. As shown in greater detail in FIG. 4 the path display algorithm 30 determines which positions of the effect are to be displayed using the effect duration, the current position into the effect and various operator selections. The effect duration is the total duration of the effect, the current position is the digital effect system's current time into the effect, and the operator selections are parameters to modify the path display. The operator selections include the portion of the path displayed, specified in time; whether the portion of the path displayed stays fixed or is centered about the current position or time; the graphic representation of the display points as either wireframes, dots or lines; and the "density" of the path display or the position rate (n/VDR) where n is an integer so that every nth position is displayed. It is noted that every keyframe is displayed, the decimating by n occuring between keyframes.

The working buffer within the DVE controller 14 contains parameters determined from the current position that define the display point. The working buffer contains keyframe parameters if the current position is on a keyframe position, and inbetween parameters if the current position falls between keyframes. In the update mode the operator changes the working buffer parameters and sees the influence these modifications would have on the effect without actually modifying the effect. A scratch effect is created by incorporating the working buffer changes into the effect, and this scratch effect is used to produce the path display. If the current position is on a keyframe position, the scratch effect is created by assuming the changes to the working buffer are modifications to this keyframe. If the current position is between keyframes, the scratch effect is created by assuming that a keyframe is inserted at the current position on the path and that modifications to the working buffer are made to this keyframe.

For each selected position the path display algorithm 30 uses this position to select from the scratch effect two consecutive keyframes and to calculate an inbetween coefficient that represents the percentage of time from the first keyframe to the second keyframe or the position relative to the position of the two keyframes. The two keyframes and coefficient together contain sufficient information to determine the display point. The display point is determined from the two keyframes and coefficient by an inbetweening algorithm in the graphics display system 18 in the same manner as "new run info" is processed by the graphics display system described in the referenced "Reduced Viewport for Graphics Display" patent application referred to above.

Figure 5:
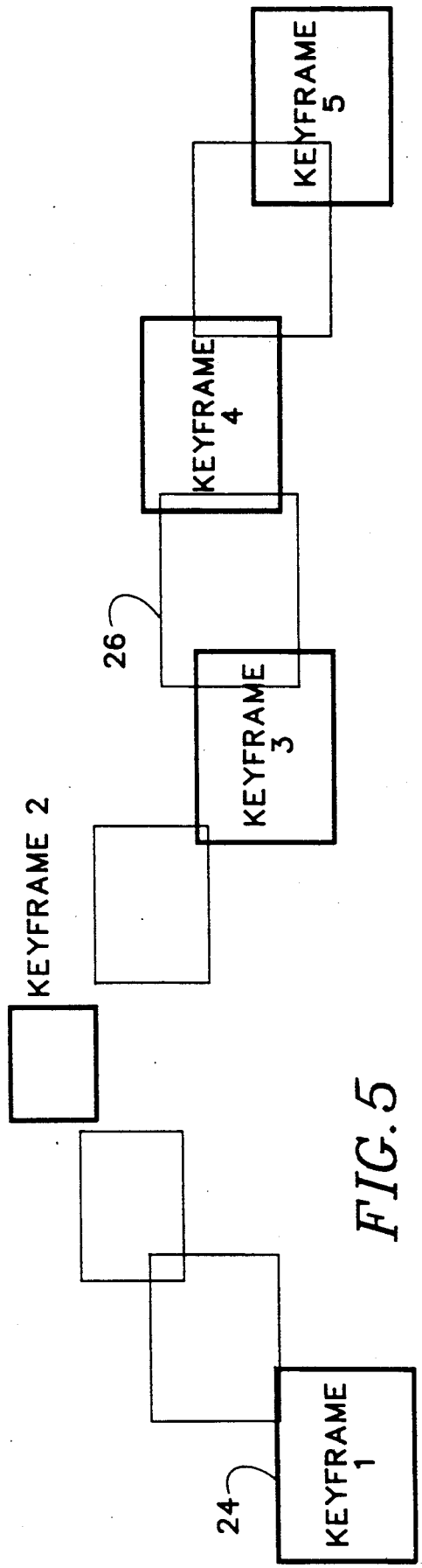
FIG. 5 is a display view of a path display generated by the graphics path prediction display of the present invention.
Figure 6:
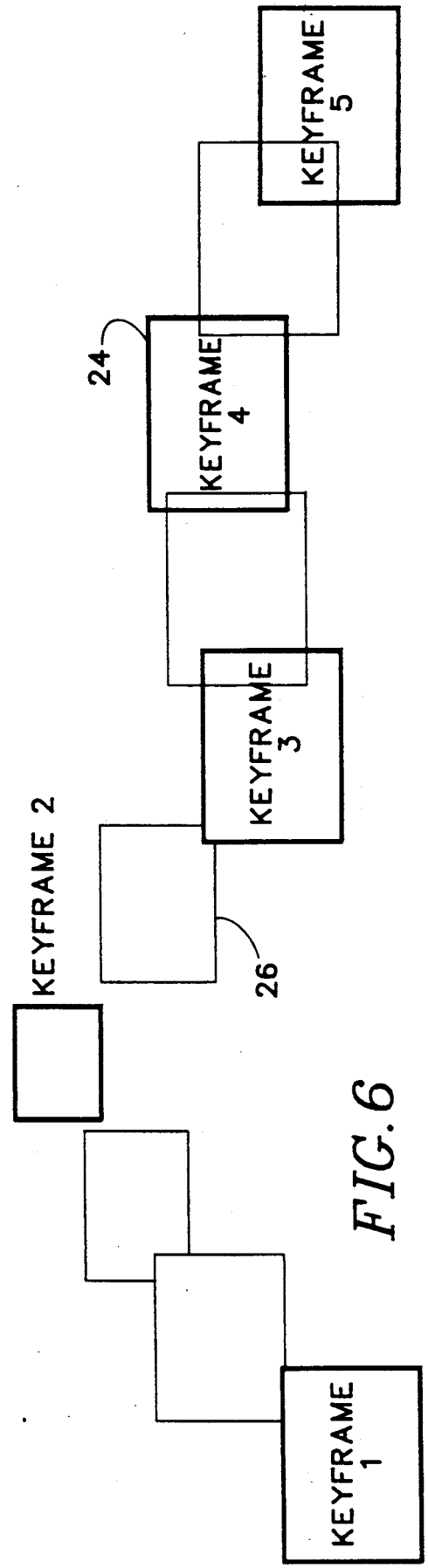
FIG. 6 is a display view of a modified path display for the video effect of FIG. 5.

Referring now to FIG. 5 the inbetween positions 26 are shown as solid wireframes without hidden line suppression, while in FIG. 6 the inbetween positions are shown with hidden line suppression to give the illusion of depth. The operator has selected the portion of the effect of FIG. 1 for display that includes the first three keyframes 24. As the operator makes changes to keyframes that affect the path, the path display algorithm 30 automatically adjusts the path display to account for the changes being made by the operator. The adjustment is done in real-time in response to joystick or knob adjustments made by the operator. The position of keyframe K2 has been changed by the operator up in the Y dimension and back in the Z dimension, causing the size of keyframe K2 to appear smaller due to perspective, and the path display algorithm 30 has presented the new effect derived from FIG. 1 as the path displays in FIGS. 5 or 6, depending upon whether the operator has selected hidden line removal or not. The resulting appearance is similar to that of a "slinky", one end of which is attached to the keyframe being modified. The operator may save these changes to retain the new effect, or may discard these changes to retain the old effect.

Thus the present invention provides a graphics path display in the form of wireframes, dots or dashes representing programmed key positions and generated inbetween positions, the inbetween positions being varied as a function of the algorithm selected and the adjustment of variable algorithm parameters.

What is claimed is:

1. A method of displaying a predicted graphics path comprising the steps of:
   selecting a portion of a video effect for display;
   modifying various parameters of the selected portion;
   generating a scratch video effect for the selected portion without actually modifying the video effect according to the modified various parameters; and
   displaying the scratch video effect to show the predicted graphics path resulting from the modifying step.

2. A method of displaying a predicted graphics path for a video effect in response to modification in various parameters that affect the running of the video effect comprising the steps of:
   generating a scratch video effect from a selected portion of the video effect and parameters for the selected portion without actually modifying the video effect, the scratch video effect having scratch keyframes;
   determining selected path positions as a function of a duration of the video effect, a current position within the duration and selected path parameters; and selecting two sequential keyframes from the scratch keyframes and calculating an inbetween coefficient as a function of the two sequential keyframes and the selected path positions, the two sequential keyframes and inbetween coefficient being used to generate a display position for the scratch video effect.

* * * * *